US007063401B2

(12) United States Patent
Haney et al.

(10) Patent No.: US 7,063,401 B2
(45) Date of Patent: Jun. 20, 2006

(54) SYSTEMS AND METHODS FOR DETERMINING PRINTHEAD IN A PRINT POSITION

(75) Inventors: Marcia D. Haney, Oregon City, OR (US); David W. Hanks, Forest Grove, OR (US); Michael W. Whalen, Tigard, OR (US); Mark H. Cowan, Sherwood, OR (US)

(73) Assignee: Xerox Corporation, Stamford, CT (US)

( * ) Notice: Subject to any disclaimer, the term of this patent is extended or adjusted under 35 U.S.C. 154(b) by 237 days.

(21) Appl. No.: 10/874,250

(22) Filed: Jun. 24, 2004

(65) Prior Publication Data

US 2005/0285887 A1 Dec. 29, 2005

(51) Int. Cl.
*B41J 29/393* (2006.01)
*B41J 25/308* (2006.01)
*G01D 15/10* (2006.01)

(52) U.S. Cl. ............................. 347/19; 347/8; 347/198

(58) Field of Classification Search ................... 347/19
See application file for complete search history.

(56) References Cited

U.S. PATENT DOCUMENTS 5,806,996 A * 9/1998 Leys et al. .................. 347/198
5,820,275 A * 10/1998 Crawford et al. ........... 400/185
6,015,205 A * 1/2000 Chambers et al. ............. 347/8

* cited by examiner

*Primary Examiner*—Lamson Nguyen
*Assistant Examiner*—Jannelle M. Lebron
(74) *Attorney, Agent, or Firm*—Oliff & Berridge, PLC

(57) ABSTRACT

A system and method for sensing the positioning the printhead in one or more of a standby position, a wipe position, and a printing position uses electrical signals from a drive motor as an indicator of whether the printhead has properly moved to a desired position. As the printhead is tilted to a print position, a first position electrical signal is detected by sampling a resistance on the torque motor at a first time. A second position electrical signal is determined by sampling another resistance on the motor at a second time. A slope is calculated between the first position sample and the second position sample. The calculated slope is analyzed to determine whether the printhead is operating properly. Thus, the need for standalone sensors to determine the positioning of the printhead is eliminated.

19 Claims, 3 Drawing Sheets

SYSTEMS AND METHODS FOR DETERMINING PRINTHEAD IN A PRINT POSITION

BACKGROUND OF THE INVENTION

1. Field of Invention

This invention generally relates to systems and methods for determining a printhead in a printing position.

2. Description of Related Art

A typical imaging apparatus, such as an ink-jet printer or a thermal printer, forms an image onto a recording medium, such as paper or film, by causing ink or the like to be deposited onto the recording medium. For example, an ink-jet printer performs printing by discharging ink through a printhead having nozzle(s) with an orifice and an electrothermal transducer which generates discharge energy for discharging ink from the orifice to form a pattern of ink dots on the recording medium. The printhead discharges the ink along a track by moving back and forth. Many printheads must also move toward and away from a printer's surface. However, the movement of the printhead may get trapped, jammed or wedged along the way. For example, in certain solid ink printing, the printhead is moved between printing, wiping and standby positions. If the printhead is not properly positioned, ink may be misdirected.

Thus, in the past, a separate sensor was required to determine the position of the printhead so that the ink could be properly ejected onto the recording medium.

For example, conventional printers use an optical sensor to ensure proper positioning of the printhead. However, separate sensors require numerous cablings and connectors to operate. Further, many printers typically have more than one sensor to determine positioning of the printhead, especially apparatus with color inks. Thus, the use of sensors becomes expensive, which drives the cost of manufacturing up. Moreover, because of the need for cables and connectors to operate the sensors, printing apparatus become large and bulky.

SUMMARY OF THE INVENTION

Considering the above conventional drawbacks, it is desired to provide a printing apparatus control method which can efficiently determine the position of the printhead without the need of separate, standalone sensors.

Accordingly, one aspect of the invention provides systems and methods for determining a printhead in a printing position without the use of standalone sensors.

One exemplary embodiment according to the systems and methods of the invention include use of electrical signals from a motor while the printhead assembly moves over a head tilt cam to determine if the printhead has properly tilted to a print position.

Another exemplary embodiment according to the systems and methods of the invention includes tilting the printhead from the standby position to the print position, sampling the electrical signal that measures torque from the motor that tilts the printhead at two positions, and calculating the slope of the signal between the two positions. The slope is then compared against a predetermined slope threshold to determine whether the printhead has properly tilted.

In various exemplary embodiments of the systems and methods according to the invention, the first and second electrical signals measure resistance force on the motor.

In various exemplary embodiments of the systems and methods according to the invention, the printhead is determined to operate properly when the calculated slope is above the predetermined threshold, for example, a positive slope.

In further various exemplary embodiments of the systems and methods according to the invention, when the cam rotates and tilts the printhead, a resistance on the motor is sensed as the motor stops at two positions on the cam. A slope is then calculated between the two sampled electrical signals and compared against a predetermined threshold.

In various exemplary embodiments of the systems and methods according to the invention, the first position samples the electrical signal at a low resistance area on the cam.

In various exemplary embodiments of the systems and methods according to the invention, the second position error is samples the electrical signal at a position on the cam that is steep giving high resistance.

In various exemplary embodiments of the systems and methods according to the invention, the slope is a calculation between the steepness of the two sampled electrical signals.

In various exemplary embodiments of the systems and methods according to the invention, a tilting arm provides movement to the printhead in different positions.

In further various exemplary embodiments of the systems and methods according to the invention, the different positions are a standby position, a wipe position, P1, P2, and a home/print position. P1 and P2 are two points on the cam where the electrical signals are sampled, from which the slope is calculated.

In various exemplary embodiments of the systems and methods according to the invention, the sensed electrical signal is a measure of motor torque.

These and other features and advantages of the invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
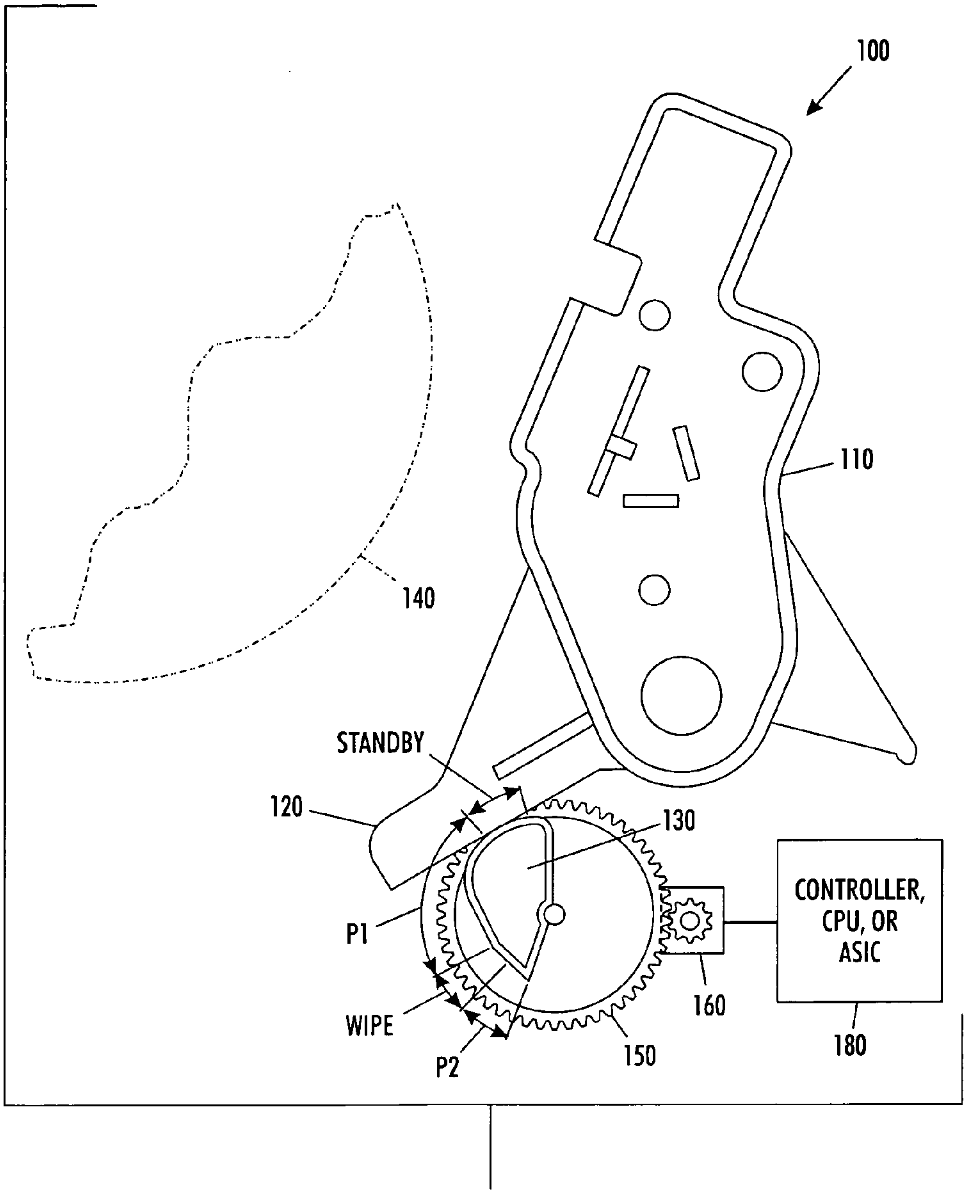
FIG. 1 illustrates an exemplary embodiment of a printing apparatus that determines printhead position over a cam according to this invention.

FIG. 1 illustrates an exemplary embodiment of an apparatus that determines the printhead position tilting over a cam according to this invention. As shown in FIG. 1, the printing apparatus 100 includes a printhead 110, a cam following arm 120, a cam 130, a rolling drum 140, a gear train 150, a motor 160, and a processing means 180, such as a controller, CPU, or ASIC.

As an exemplary embodiment, the printing apparatus 100 is a solid-ink printer, for example, a Xerox 8400 printer.

However, the invention is not limited to this and is applicable to any type of printing apparatus having a reciprocating or movable printhead.

In solid-ink printing, the printhead 110 ejects an ink onto the rolling drum 140 that transfers the ink onto a recording medium, for example, but not limited to, paper, labels, transparencies, envelopes and business cards. The printhead 110 has an array of nozzles that can jet out a predetermined quantity of ink into the surface of drum 140 as known in the art.

The cam following arm 120 provides movement to the printhead 110 enabling the printhead 110 to be positioned in various positions either closely adjacent to drum 140 or away from drum 140. This is achieved by engagement with the cam 130.

In an exemplary embodiment, the different positions are a standby, a wipe, P1, P2, and a home/print position. In the standby position, the cam following arm 120 moves the printhead 110 in a position that is tilted away and farthest from the rolling drum 140. In the wipe position, the cam following arm 120 moves the printhead 110 to a position where it can be engaged with a wiping device, such as, for example, a wiper blade. In the print/home position, the cam following arm 120 moves the printhead 110 close to the rolling drum 140 so that the ink can be applied on the drum 140. Positions P1 and P2 are the locations on the cam where the electrical signals are read to calculate the slope.

The cam 130 includes gear train 150 to drive the cam 130 via motor 160 having mating gear teeth. An exemplary motor is a servomotor. The print head tilt servomotor provides data to the controller that is related to the movement of the motor. If the torque is high or low the feedback gives the controller the information to make corrections, for example to keep a constant velocity. The positions on the cam where this feedback is read are designed to show a low and high resistance, from which the slope is calculated. This same feedback could be used in other cam designs, to show resistance and profile. Upon activation of drive motor 160, cam 130 rotates, which causes cam following arm 120 to move relative to the cam 130 to cause printhead 110 to tilt from the shown standby position to either a wipe position or a print position. Electronic signals of the motor 160 are sampled at cam locations P1 and P2. The position P1 corresponds to a time when the cam following arm 120 should be in contact with an area on the cam 130 that is not steep. During the sampling at P1, there will not be much spring force. As such, resistance acting on the drive motor should be low. The sampling at P2 corresponds to a time when the cam following arm 120 should be in contact with an area on the cam 130 that is steep. During the sampling at P2, there will be more spring force as higher resistance is needed to hold the tilt arm position on the cam. As such, resistance acting on the motor is higher. Processing means 180 then analyzes the electrical signals by calculating the slope between the two position samples to determine whether the printhead 110 is at a desired location.

Figure 2:
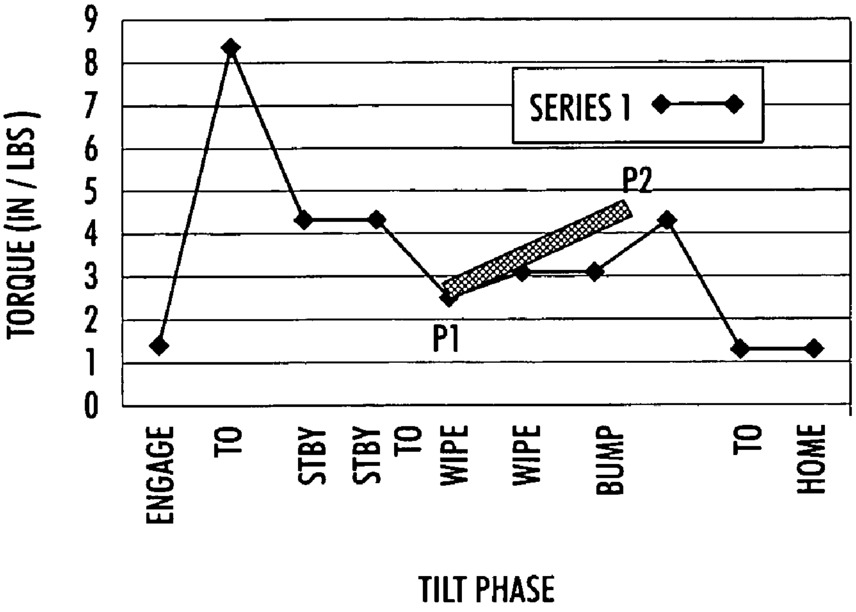
FIG. 2 is a chart of a slope for a position error when the printhead is in proper working condition.

FIG. 2 is a chart comparing the motor torque (in/lbs) and slope between P1 and P2, when the printhead 110 is in proper working condition. As shown in FIG. 2, the chart compares the resistance or torque (in/lbs) of the motor during the various tilt phases of the printhead 110.

As an exemplary embodiment, the various tilt phases are positions of the printhead 110 in relationship to the cam 130. For example, the various tilting phases of the printhead 110 are a standby position, a wipe position and a home/print position, and various intermediate positions.

As shown in FIG. 2, prior to the standby position, the printhead 110 assembly 100 engages with the cam 130, which results in an increase of torque as the motor 160 produces a high resistance. As an exemplary embodiment, the resistance prior to standby position is 1.4 in/lbs and increases to 8.36 in/lbs. Next, as the printhead 110 assembly is moved from the standby position, the resistance reduces until the printhead 110 is in the wipe position. As an exemplary embodiment, the resistance decreases from 8.36 in/lbs to 4.33 in/lbs in the standby position. In the wipe position, a blade on the printhead 110 moves over the cam 130. It is during the wipe position that the position errors at two spaced positions P1 and P2 of the motor 160 can be determined. As an exemplary embodiment, the resistance at P1 is 2.5 in/lbs and the resistance at P2 is 4.3 in/lbs. Reading the position errors P1 and P2 as the motor 160 moves over the cam 130 can determine whether the printhead 110 is in a proper working condition if P2 is greater than P1. Finally, the printhead 110 returns to the print position. As an exemplary embodiment, the resistance at this print position is 1.3 in/lbs.

In various exemplary embodiments, position P1 occurs when the arm 120 is in contact with a flatter location on the cam 130 where there is not much resistance force (low torque), and position error P2 occurs when the cam following arm 120 is in contact with the cam 130 right before a steeper part on the cam 130 so as to cause more resistance force (high torque). As shown in FIG. 2, the slope line between position errors P1 and P2 when operating properly is a positive slope and above some designated threshold (e.g., P2 is higher than P1) which indicates that the printhead 110 is rotating over the cam 130 properly and the printhead 110 is properly tilting to the home/print position. At this print position, the printhead 110 is ready to eject ink onto the drum to produce the image.

Figure 3:
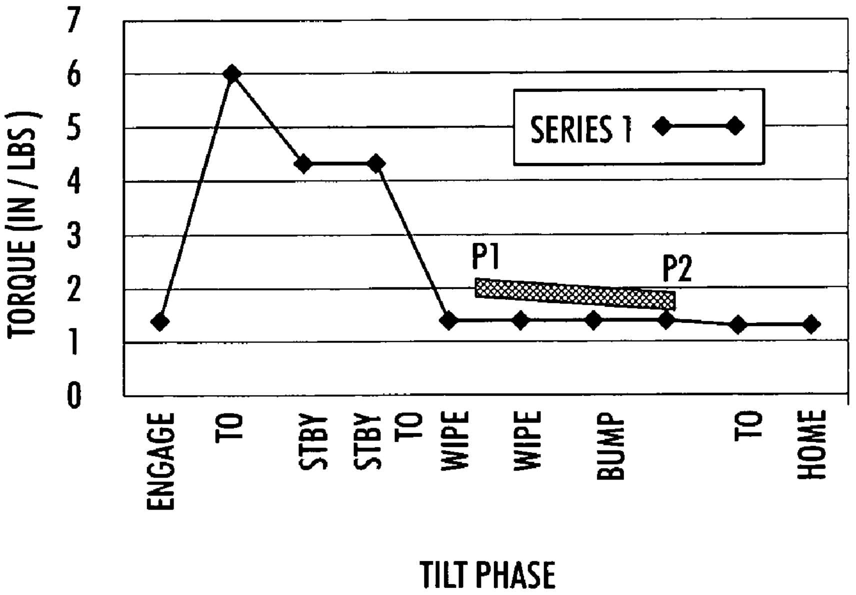
FIG. 3 is a chart of a slope for a position error when the printhead is not in proper working condition.

FIG. 3 is a chart when the printhead 110 is not in proper working condition. The various tilting positions are the same as shown in FIG. 2.

As shown in FIG. 3, the printhead 110 similarly engages the cam 130 as shown in FIG. 2 until it reaches the wipe position. As an exemplary embodiment, the resistance prior to the standby position is 1.4 in/lbs, the same as the printhead 110 in proper working condition, and increases to 6.0 in/lbs. In this example, the print head was jammed in the standby position, therefore the cam following arm 120 could tilt with resistance to the standby position. Next, as the printhead 110 advances to the standby position, the resistance reduces until the printhead 110 is in a wipe position, which has the same resistance value as when the printhead 110 is operating properly. As an exemplary embodiment, the resistance decreases from 6.0 in/lbs to 4.33 in/lbs in the standby position. When tilting from the standby position towards the home/print position in FIG. 3, the resistance on the motor 160 is determined to be relatively low at both locations P1 and P2 since there is no resistance on the motor 160 going over the cam 130. As an exemplary embodiment, the resistance during this move remains constant at 1.4 in/lbs. The low resistance can be attributed to the printhead 110 being stuck in the standby position or other obstruction that does not permit the printhead 110 to move over the cam 130 properly. Finally, during the return to the print position, the resistance remains relatively unchanged. As an exemplary embodiment, the resistance at this print position is 1.3 in/lbs.

However, as shown in FIG. 3, the slope line between position P1 and P2 is less than the designated threshold. (e.g., P2 is was not sampled high enough above P1), which indicates the printhead 110 is not moving over the cam 130 in a proper manner. The sampling of electrical signals at P2 160 indicates that there is no resistance when stopped at the steep part of the cam 130 that generally causes a high resistance. From experiments, this has been determined to be a reliable indicator that the printhead 110 is not being correctly positioned because it should have a positive slope above the designated threshold. This is an indication that the printhead 110 is not in the desired position.

It should be appreciated that the resistance during the tilting of the printhead is generally higher when the printhead 110 is operating properly than when the printhead 110 is not operating properly. However, for different cam 130 profiles, the values can be changed. What is important is that there is a known slope threshold that signifies improper operation of the printhead assembly.

Figure 4:
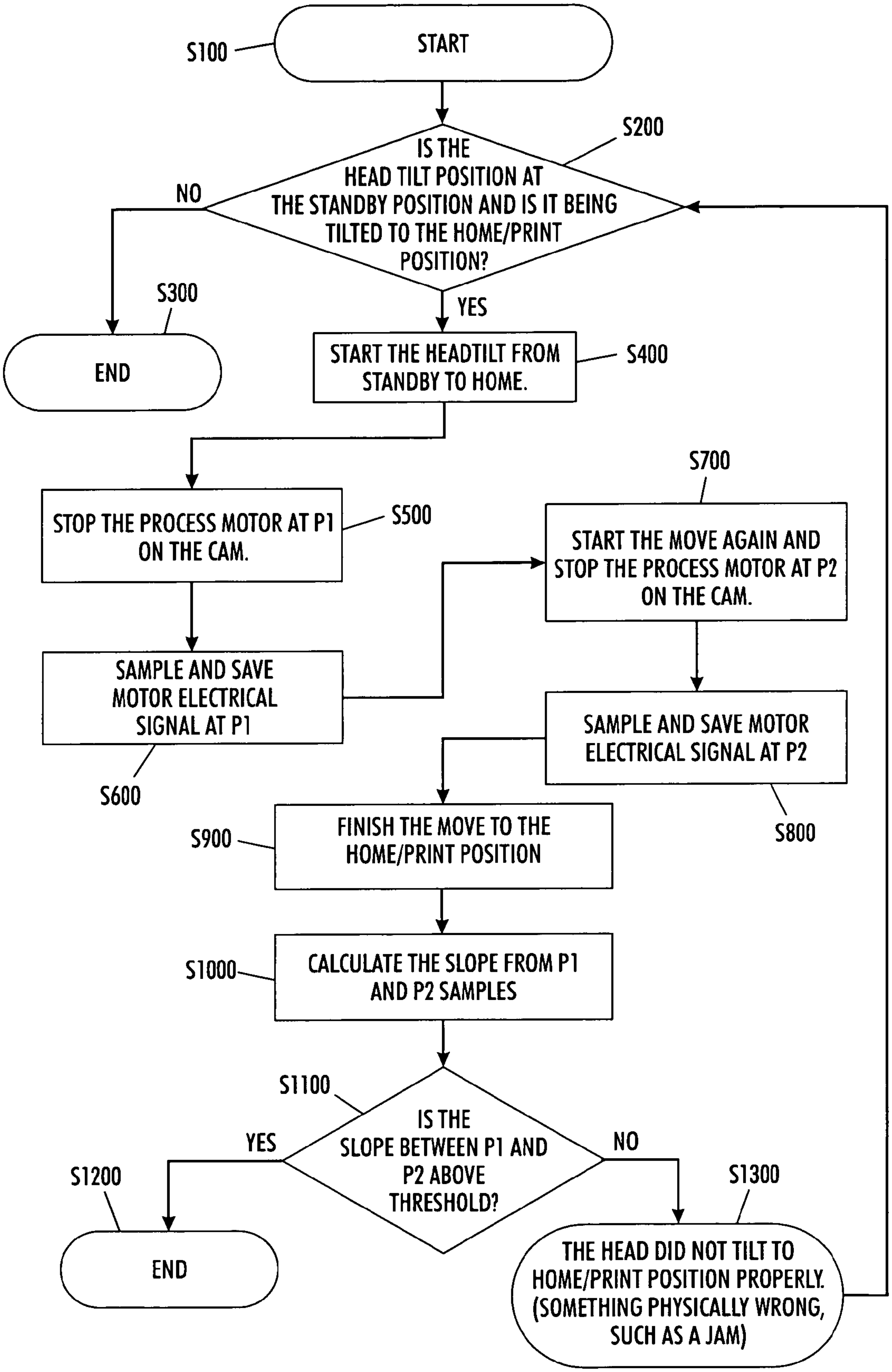
FIG. 4 is a flowchart outlining one exemplary embodiment of a method for determining the position of the printhead according to this invention.

FIG. 4 is a flowchart outlining an exemplary embodiment of a method for determining the position of the printhead 110 to this invention. As shown in FIG. 4, beginning in step S100, operation of the method continues to step S200, which determines whether tilt position of the printhead 110 is in the standby position and is it being tilted to the home (print) position.

If it is determined at step S200 that the printhead 110 is not tilted in the standby position, operation continues to step S300 which terminates the checking of the position of the printhead 110. On the other hand, if it is determined at step S200 that the printhead 110 is at the standby position, operation proceeds to step S400.

In step S400, the operation moves the headtilt of the printhead 110 from the standby position to the printing position. In various exemplary embodiments, the printing position is when the printhead 110 is properly positioned relative to a printing surface, such as rolling drum 140.

At step S500, the engaged printhead 110 stops the motor 160 to sample the electrical signal at P1 on the cam 130. In various exemplary embodiments, position P1 is a flatter location on the cam 130 where there is not much resistance force. Operation then proceeds to step S600.

In step S600, the operation samples the motor 160 electrical signal, such as motor torque, and saves the samples for P1. Operation then proceeds to step S700.

At step S700, the operation restarts the motor 160 to tilt the printhead and stop at position P2. At step S800, the process samples the motor 160 electrical signal, such as motor torque, and saves the samples for P2. In various exemplary embodiments, position P2 is the location on the cam 130 adjacent to the large steep part of the cam that causes a higher resistance force, in order for the printhead to keep its position. Operation then proceeds to step S900.

At step S900, the operation finishes tilting the printhead 110 to the print/home position, and proceeds to step S1000 to calculate the slope using P1 and P2 electrical signal samples. In various exemplary embodiments, the slope is calculated by calculating the difference between the two samples P2 and P1.

In various exemplary embodiment, if the slope is above or equal to the designated threshold, the operation indicates that the printhead 110 is tilting over the cam 130 in proper working order. In a further various exemplary embodiment, if the slope is below the designated threshold, the operation indicates that the printhead 110 is not tilting over the cam 130 in proper working order. For example, but not limited to, the printhead 110 is jammed and unable to tilt. If the calculated slope is below the threshold there is less resistance on the motor 160 than should be as the printhead 110 moves over the cam 130.

If it is determined at step S1100 that the slope between P1 and P2 is above or equal to the designated threshold, the operation continues to step S1200 which terminates the operation and indicates the tilting of the printhead 110 to the home/print position was successful. On the other hand, if it is determined at step S100 that the slope between P1 and P2 is below the designated threshold, operation proceeds to step S1300.

At step S1300, the operation determines that the printhead 110 did not properly tilt to the home/print position, and repeats the operation at step S200. An error or other indicator may be provided to alert the user to the problem.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made to the invention without departing from the spirit and scope thereof.

What is claimed is:

1. A method for determining whether a printhead has reached a desired position without a standalone sensor, comprising:

tilting the printhead from a standby position to a print position using a drive motor;

determining a first position sample by sampling a first electrical signal from the drive motor at a first time;

determining a second position sample by sampling a second electrical signal from the drive motor at a second subsequent time;

calculating a slope between the first position sample and the second position sample; and comparing the calculated slope to a predetermined slope to determine whether the printhead has properly moved to the desired position.

2. The method according to claim 1, wherein the printhead is determined to have properly reached the desired position when the calculated slope is above a designated threshold, the slope indicating that the second sample is higher than the first sample.

3. The method according to claim 1, wherein the printhead is determined to have not properly reached the desired position when the calculated slope is below the designated threshold, the slope indicating that the second position is not far enough above the first position.

4. The method according to claim 1, wherein the printhead is tilted by a cam having a known profile.

5. The method according to claim 4, wherein the first position is sampled at a portion of the cam having a low resistance force when the printhead is operating properly.

6. The method according to claim 4, wherein the second position is sampled at a position of the cam having a high resistance force when the printhead is operating properly.

7. The method according to claim 4, wherein the first position is determined at a less steep area of the cam and the second position error is determined at a steep location on the cam.

8. The method according to claim 1, wherein the electrical signal corresponds to a measure of motor torque.

9. A printing apparatus for determining whether a printhead has reached a desired printing position among several possible printhead positions without a standalone sensor, comprising:

a printhead;

a tilting arm connected to the printhead for moving the printhead in different positions;

a cam engaged with the tilting arm;

a drive motor connected to the cam for rotation of the cam, the drive motor generating variable electrical signals depending on a load of the drive motor;

means for sampling the electrical signals at least first and second times to determine first and second position values;

calculating means for calculating a slope of the first and second sampled electrical signals; and determining means for determining whether the printhead is in the desired position based on the calculated slope.

10. The printing apparatus according to claim 9, wherein the positions are a standby position, a wipe position and a print position.

11. The printing apparatus according to claim 10, wherein at the standby position, the printhead tilts away from a printing surface.

12. The printing apparatus according to claim 10, wherein at the print position, the printhead is moved closer to a printing surface so that ink can be applied to the surface.

13. The printing apparatus according to claim 10, wherein the printhead is determined to have properly reached the desired position when the calculated slope is positive, the positive slope indicating that the second position sampled is a designated threshold higher than the first position sampled.

14. The printing apparatus according to claim 10, wherein the printhead is determined to have not properly reached the desired position when the calculated slope is below the designated threshold, the slope indicating that the second position sampled is not a designated threshold above the first position.

15. The printing apparatus according to claim 10, wherein the printhead is tilted by the cam having a known profile.

16. The printing apparatus according to claim 15, wherein the first position is sampled at a portion of the cam having a low resistance force when the printhead is operating properly.

17. The printing apparatus according to claim 15, wherein the second position is sampled at a position of the cam having high resistance force when the printhead is operating properly.

18. The printing apparatus according to claim 15, wherein the first position is determined at a flatter area of the cam and the second position error is determined at a steep area on the cam.

19. The printing apparatus according to claim 9, wherein the electrical signal corresponds to a measure of motor torque.

* * * * *